March 3, 1964

C. A. MATTSON 3,123,111

SAWDUST DISCHARGE FOR CIRCULAR SAW

Filed March 2, 1962

INVENTOR:
Charles A. Mattson
BY
George R. Clark, atty

March 3, 1964 C. A. MATTSON 3,123,111
SAWDUST DISCHARGE FOR CIRCULAR SAW
Filed March 2, 1962 2 Sheets-Sheet 2
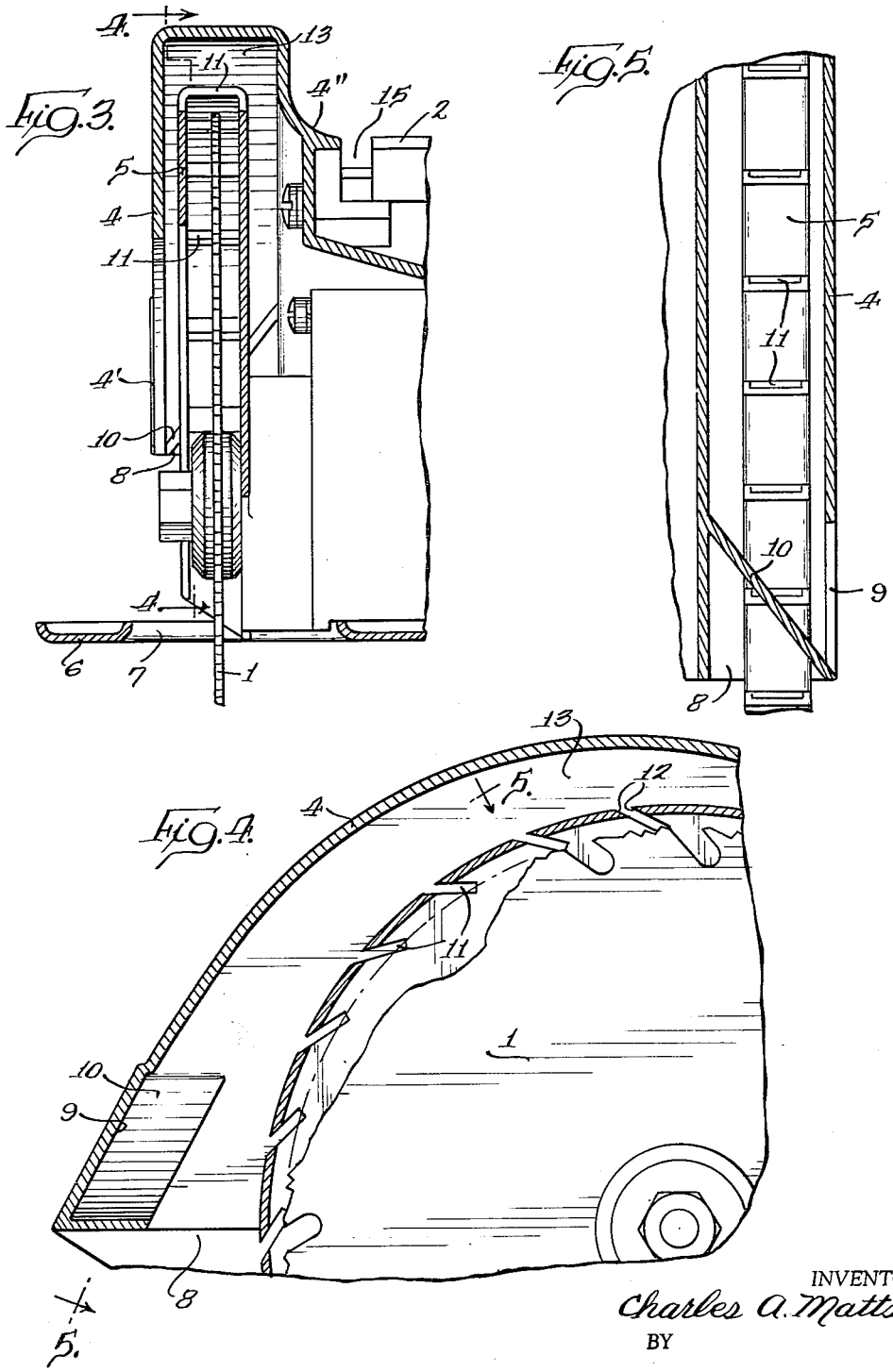
INVENTOR:
Charles A. Mattson
BY
George R. Clark
Att'y United States Patent Office 3,123,111
Patented Mar. 3, 1964

3,123,111
SAWDUST DISCHARGE FOR CIRCULAR SAW
Charles A. Mattson, Oak Park, Ill., assignor to Sunbeam
Corporation, Chicago, Ill., a corporation of Illinois
Filed Mar. 2, 1962, Ser. No. 177,001
1 Claim. (Cl. 143—157)

This invention relates to an improved sawdust discharge for circular saws, and more particularly, to an improved sawdust discharge for portable circular saws.

This invention is useful in portable electrical saws of the type illustrated in Design Patent 180,181 assigned to the same assignee as the instant invention. This form of saw has a rotating circular blade which is substantially completely enclosed by two guards which are positioned along the periphery of the blade. The guards are generally semi-annular in shape and generally U-shaped in cross section. One of the guards is fixed whereas the other guard is movable. The movable guard is arranged to be telescoped within the fixed guard as work is fed into the blade.

The periphery of the blade is spaced from the periphery of the fixed guard and the same is true of the periphery of the movable guard with respect to the periphery of the fixed guard when the two guards are telescoped with respect to each other. The rotating blade has a fan effect so that sawdust will be carried from the forward part of the blade rearwardly along the fixed guard. When the sawdust is discharged from the rear end of the fixed guard, it is directed in a downward direction on the work which is being sawed as well as the saw user's feet. This is undesirable, and therefore, it would be desirable to provide a discharge opening in the fixed guard which would direct the sawdust away from the work and the body of the saw user.

This can be accomplished by providing a sawdust discharge opening in the rear portion of the fixed guard which will discharge the sawdust in a direction laterally away from the plane of the blade and, therefore, also away from the body of the saw user. However, the movable guard has the effect of blocking off the discharge opening and reducing the fan effect of the blade for moving the sawdust rearwardly along the fixed guard. That is to say, the space between the telescoped guards will become clogged with sawdust, and the same is true of the discharge opening. This problem cannot be overcome merely by increasing the spacing between the two guards. This is because as the movable guard is telescoped within the fixed guard it progressively covers more of the periphery of the blade and, therefore, forms a barrier between the blade and the fixed guard along which the sawdust is to be directed. Furthermore, an increase in spacing between the peripheries of the two telescoped guards would require enlarging the fixed guard. This is undesirable inasmuch as the size of the saw is thereby increased whereas it is preferable to make the device as small and compact as possible.

It is an object of this invention to provide an improved sawdust discharge means which will overcome the above-mentioned disadvantages of the prior art.

It is a further object of the invention to provide an improved sawdust discharge means for circular saws having a fixed guard and a movable guard which is movable within the fixed guard.

It is a further object of the invention to provide an improved sawdust discharge means for circular saws having telescopic fixed and movable guards which can be readily incorporated into existing saws without any major modifications or changes in the conventional basic structure thereof.

The features of the invention which are believed to be novel are set forth with particularity in the appended claims. The invention itself, however, both as to its organization and operation, together with further objects and advantages thereof, may best be understood by reference to the following description taken in connection with the accompanying drawings.

In the drawings,

FIG. 3 is an enlarged sectional view taken along the section line 3—3 of FIG. 1;

FIG. 4 is an enlarged broken away view of the left-hand sawdust discharge chute part of FIG. 1; and FIG. 5 is a sectional view taken along the section line 5—5 of FIG. 4.

In the preferred form of the invention, a sawdust discharge opening is formed in the rear portion of the fixed saw blade guard. The discharge opening is adapted to exhaust the sawdust in a direction laterally away from the plane of the saw blade. The periphery of the movable saw blade guard has vent opening means formed therein so that the discharge opening and the inside of the fixed guard are not blocked off from the fan effect of the saw blade which is utilized to move the sawdust rearwardly along the inside of the fixed guard to the discharge opening.

Figure 1:
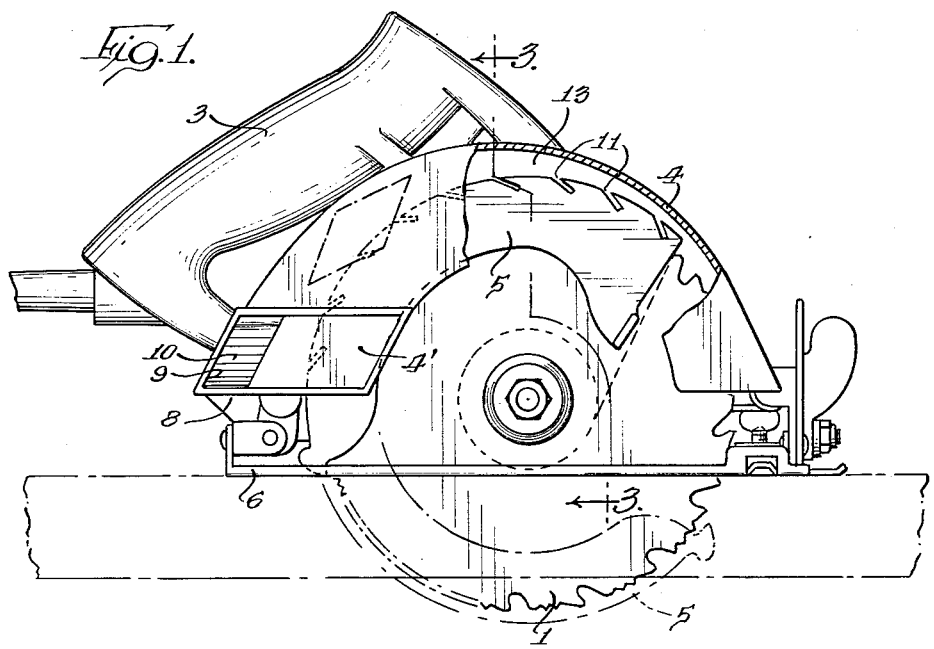
FIG. 1 is a broken away side elevation view of a portable circular saw utilizing the invention.

Referring now particularly to FIG. 1 of the drawings, illustrated therein is one well known form of portable electric saws. This type of saw is available on the commercial market, and therefore, the device will be only generally described to the extent necessary to understand the instant invention.

Figure 2:
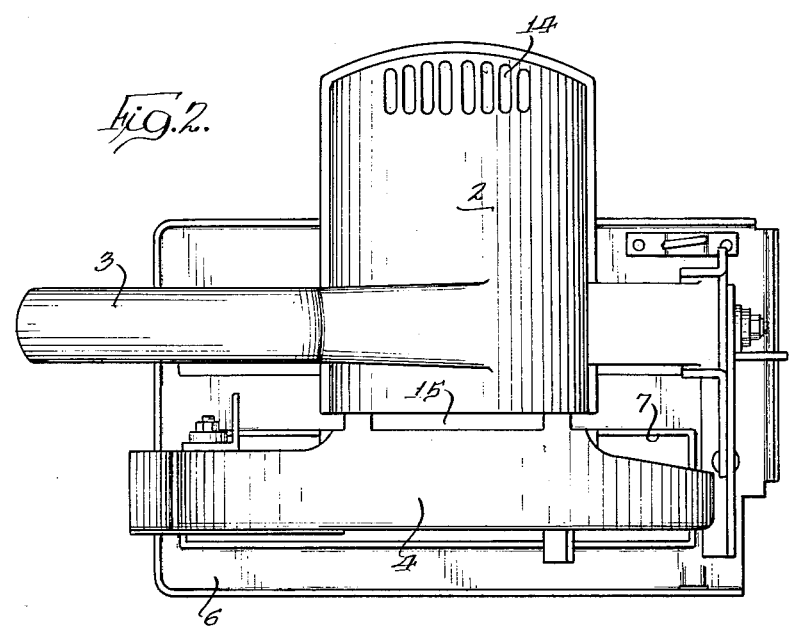
FIG. 2 is a top view of the saw.

The illustrated saw comprises a rotatable circular saw blade 1. The blade is driven by a not shown electric motor contained within a motor housing 2, see FIG. 2. A handle 3 is connected to the device. The saw is guarded by a fixed guard 4, and a movable guard 5. The device has a generally horizontally disposed guide shoe 6. Guide shoe 6 has an opening 7 formed therein. The blade 1 is generally vertically disposed and its lower part projects through the opening 7 to beneath the guide shoe 6.

The guards 4 and 5 are generally semi-annular in shape and have generally U-shaped cross sections. The fixed guard 4 is disposed above the guide shoe 6, whereas the movable guard 5 is disposed beneath the guide shoe 6 when the saw is not being used, as shown by broken lines in FIG. 1. The left-hand end of the movable guard 5 extends through the opening 7. The handle 3 projects in a rearward direction of the device, and work which is to be sawed is fed into the blade 1 by pushing the device in a forward direction along the upper surface of the work on the guide shoe 6. When the work engages the blade 1, it will also engage the right-hand end of the movable guard 5 and cause it to swing or rotate in a clockwise direction into telescopic relationship with respect to the fixed guard 4. The details of the mounting for the movable guard 5 for the purpose of swinging or moving it into telescopic relationship with the fixed guard 4 are not being described herein inasmuch as this means and its details are well understood by those skilled in the art.

As the blade 1 cuts into the work which is being sawed, the resulting sawdust is thrown tangentially of the forward peripheral portion of blade 1 against the forward inside surface of fixed guard 4. The upper part of blade 1 also has tangential air currents created along the periphery thereof along the curved length of the fixed guard 4. This results in continuous movement of the sawdust from the front end of fixed guard 4 to its rear end. In conventional saws the lowermost rear edge of the fixed guard 4 operates as the sawdust discharge opening indicated by reference numeral 8. Obviously sawdust exhausted out of opening 8 will be directed on the work which is being sawed as well as the saw user's feet. Furthermore, when the movable guard 5 is telescoped within the fixed guard 4, it decreases the space available within the inside of guard 4 for rearward movement of the sawdust and also blocks off the inside of the fixed guard 4 from the blade 1 so that the tangential air currents created by blade 1 are no longer available to scavenge the sawdust along the inside of fixed guard 4. This may result in clogging of the space between the two telescoped guards as well as the discharge opening 8. These advantages are overcome by the instant invention which will now be more particularly described. The structure so far described is conventional.

In the invention an improved discharge opening 9 is formed in the rear portion 4' of fixed guard 4 which can be thickened if desired for reinforcing purposes. Discharge opening 9 has a curved surface 10 which merges with opening 9 and the inner surface of the fixed guard 4. Surface 10 is curved or sloped so as to direct the sawdust out of opening 10 in a direction laterally away from the plane of blade 1. In this manner discharged sawdust is not deposited on the work which is being sawed or the saw user's body.

Additionally, in the invention vent opening means is formed in the movable guard 5 so that the discharge opening 9 is not isolated from the blade 1 and its tangential air currents when movable guard 5 is moved within fixed guard 4. In the preferred form of the invention, the vent opening means comprises a plurality of apertures 11 formed in the periphery of movable guard 5 and preferably along the whole length thereof. Also, the end surfaces 12 of the openings 11 preferably are slanted in a rearward direction. This is so as to facilitate passage of the tangential air currents from the blade 1 through the movable guard 5 to the space 13 between the two telescoped guards 4 and 5. Sawdust within guard 5 can also escape through openings 11 into space 13 for eventual lateral discharge through opening 9 instead of downward discharge through the rear of guard 5.

Although the vent opening means 11 is disclosed as being used in connection with the improved discharge opening 9 and its curved surface or sawdust directing chute 10, it will be obvious to those skilled in the art that the vent opening means 11 could be utilized solely with the conventional sawdust opening 8. However, the sawdust discharge means 9, 10 is preferred over that of 8 for several reasons. The means 9, 10 directs the exhausted sawdust away from the work which is being cut as well as the operator's body. Additionally, if desired, the means 9, 10 can be located appreciably forward of the conventional discharge opening 8 as indicated by the broken lines on guard 4 of FIG. 1 so that the sawdust has a shorter distance to travel along the space 13 before it is discharged. The sawdust has a maximum velocity at the forward end of the fixed guard 4 and it decreases in velocity as it moves rearwardly in the space 13 by virtue of the frictional drag imposed by the surfaces of guards 4 and 5 which define the space 13. Therefore, if the means 9, 10 is disposed in the rear portion of guard 4 substantially forward of the conventional opening 8, there will be less likelihood of clogging of the space 13 and the discharge opening.

Furthermore, although the vent opening means 11 is illustrated as being distributed along the whole peripheral length of the movable guard 5, it will be obvious to those skilled in the art that this does not necessarily have to be the case. For instance, substantial benefits are derived from the invention if the vent opening means 11 is formed solely in the part of the guard 5 which is disposed in front of the discharge opening 9, 10 when the guard 5 is telescoped within the guard 4. The surface 10 preferably extends across the space 13 so that no sawdust will find its way into the space 13 behind the surface 10. However, inasmuch as some sawdust may find its way into that portion of space 13 behind the surface 10 preferably the vent opening means 11 is distributed along the entire length of the movable guard 5. Furthermore, it will be obvious to those skilled in the art that the vent opening means 11 does not necessarily have to have the configuration illustrated in the drawings. For instance, instead of having a plurality of spaced openings 11, the vent opening means could comprise a continuous slot formed lengthwise of the periphery of movable guard 5.

It will now be obvious that the invention provides an improved sawdust discharge means for circular saws having a movable and fixed guard which substantially enclose the entire periphery of the saw blade and then telescope with respect to each other so as to provide maximum safety for the user of the saw. The invention has particularly utility in those cases in which the guards are substantially semi-annular so as to essentially totally enclose the saw blade therebetween. The invention will find utility in movable guards which are substantially shorter than the guard 5 illustrated in the drawings. However, obviously the problem of preventing clogging by the sawdust is less acute when the movable guard is substantially shorter than that illustrated or only moves part way into the fixed guard.

Furthermore, it will now be seen that the invention provides an improved sawdust discharge means which can be readily incorporated into existing circular saws at a low cost and without requiring any major changes or modifications in the conventional basic structure thereof. This is because the invention represented by the elements 9 to 12 require a minimum number of uncomplicated parts which can be readily designed into conventional electric saws. For example, the motor housing 2 has conventional air inlet and outlet openings 14 and 15, respectively, for purposes of cooling the motor therein. The outlet openings 15 are isolated from the interior of the guards 4 and 5 and the sawdust therein by the back 4" of guard 4. Therefore, the motor exhaust or other special means does not have to be relied upon to scavenge the space 13 of sawdust, but this is accomplished solely by the fan action of the saw blade.

While there has been shown and described a particular embodiment of the invention, it will be obvious to those skilled in the art that changes and modifications may be made without departing from the invention, and that it is intended by the appended claims to cover all such changes and modifications as fall within the true spirit and scope of the invention.

What is claimed as new and desired to be secured by Letters Patent of the United States is:

In a portable electric saw, a rotary circular saw blade, two generally semi-annular saw blade guards having generally U-shaped cross sections, said guards being disposed along the periphery of said blade and shielding substantially the whole periphery thereof, one of said guards being movable and the other guard being fixed, the inside of said fixed guard being spaced from the blade for movement in a circumferential direction of the movable guard within the fixed guard, a circumferentially extending space between the guards when disposed one within the other, a discharge opening formed in the fixed guard, said discharge opening being in communication with said space through a sawdust discharge chute, said chute comprising a wall formed across said space, said wall being curved for the discharge of sawdust through said opening in a direction laterally away from the plane of said blade, and vent opening means formed along the periphery of said movable guard whereby solely the fan effect of said blade is effective to move sawdust rearwardly along said space into said chute.

References Cited in the file of this patent

UNITED STATES PATENTS

| D. 180,181 | Ernest | Apr. 30, 1957 |
| 145,375 | Weaver | Dec. 9, 1873 |
| 1,999,138 | Mason | Apr. 23, 1935 |
| 2,861,607 | Emmons | Nov. 25, 1958 |

FOREIGN PATENTS

| 46,342 | Germany | Mar. 9, 1889 |